(12) United States Patent
Dunuwila et al.

(10) Patent No.: US 7,938,981 B2
(45) Date of Patent: May 10, 2011

(54) DEICING AND HEAT TRANSFER FLUID COMPOSITIONS

(75) Inventors: Dilum Dunuwila, Princeton, NJ (US); Roger L. Bernier, Montreal (CA)

(73) Assignee: Bioamber S.A.S. (FR)

( * ) Notice: Subject to any disclaimer, the term of this patent is extended or adjusted under 35 U.S.C. 154(b) by 0 days.

(21) Appl. No.: 12/889,556

(22) Filed: Sep. 24, 2010

(65) Prior Publication Data

US 2011/0073796 A1 Mar. 31, 2011

Related U.S. Application Data

(63) Continuation of application No. PCT/CA2009/000809, filed on Jun. 8, 2009.

(51) Int. Cl.
*C09K 3/18* (2006.01)
*C09K 5/10* (2006.01)
*C09K 5/20* (2006.01)
*C12P 7/40* (2006.01)
*C12P 7/46* (2006.01)
*F01P 3/00* (2006.01)
*H01Q 1/02* (2006.01)

(52) U.S. Cl. ............... 252/70; 106/13; 252/71; 252/74; 252/76; 252/79; 424/195.15; 424/195.16; 424/780; 435/41; 435/132; 435/136; 562/400; 562/480; 562/515

(58) Field of Classification Search ............... 106/13; 252/70, 71, 74, 75, 79; 424/195.15, 195.16; 424/780; 435/41, 132, 136; 562/400, 480, 562/515

See application file for complete search history.

(56) References Cited

U.S. PATENT DOCUMENTS

| | | | | |
|---|---|---|---|---|
| 5,104,562 A | * | 4/1992 | Kardos et al. | 252/79 |
| 5,324,442 A | * | 6/1994 | Mathews | 252/70 |
| 6,156,226 A | * | 12/2000 | Klyosov et al. | 252/70 |
| 6,287,480 B1 | * | 9/2001 | Berglund et al. | 252/70 |
| 6,516,226 B1 | | 2/2003 | Bishay et al. | |
| 6,623,657 B1 | * | 9/2003 | Berglund et al. | 252/70 |
| 6,635,188 B1 | * | 10/2003 | Berglund et al. | 252/70 |
| 6,846,431 B1 | | 1/2005 | Dunuwila et al. | |

FOREIGN PATENT DOCUMENTS

| | | |
|---|---|---|
| CA | 2 318 258 | 3/2007 |
| CA | 2 601 759 A1 | 8/2007 |
| DE | 40 34 217 A1 | 5/1991 |

\* cited by examiner

*Primary Examiner* — Anthony J Green
(74) *Attorney, Agent, or Firm* — DLA Piper LLP (US)

(57) ABSTRACT

A composition for deicing or for the preparation of a heat transfer fluid is provided. The composition comprises a mixture of at least two carboxylic acid salts having a t/c ratio of 2 or lower, including a dicarboxylic salt and a monocarboxylic salt, said dicarboxylic salt being present in the mixture in an amount of at least 50 wt % of the weight of the mixture, on a dry basis. More particularly, said mixture is including a succinate and a formate, wherein the succinate is in an amount of at least 50 wt %, on a dry basis. Also provided is a method for deicing a surface or preventing the accumulation of ice, snow or a mixture thereof on a surface, comprising a step of applying on a surface covered by ice, snow or a mixture thereof, or susceptible of being covered by ice, snow or a mixture thereof, the above composition. The composition is also useful for the preparation of a heat transfer fluid coolant to be used in a heat transfer system comprising a heat transfer fluid provided with a cooling system.

23 Claims, 7 Drawing Sheets

US 7,938,981 B2

DEICING AND HEAT TRANSFER FLUID COMPOSITIONS

RELATED APPLICATIONS

This is a continuation of International Application No. PCT/CA09/000,809, with an international filing date of Jun. 8, 2009 (WO 2009/146562 A1, published Dec. 10, 2009), which is based on Canadian Patent Application No. 2,634,382, filed Jun. 6, 2008, the subject matter of which is incorporated by reference.

TECHNICAL FIELD

This disclosure relates to compositions and methods of using the same in various applications such as for residential and commercial deicing applications or for the preparation of heat transfer fluids. The compositions may be obtained at least in part from a fermented broth containing salts of carboxylic acid.

BACKGROUND

Chemical deicing is routinely used during the winter season to maintain safer conditions on sidewalks, roads, highways and airports. There are currently numerous materials and compositions used for deicing applications. However, there are many disadvantages to such materials, including their corrosiveness and impact on the environment.

Acetate and formate salts, such as potassium salts, are used in airport runway deicing applications. However, there is evidence that current runway deicing products including potassium acetate and formate cause serious threats to the integrity of the runways and the supporting infrastructure, for example, at major airports. Airport manages are increasingly paying closer attention to how these chemical agent affect the integrity of runways. Any structural decay caused by such chemicals could lead to lost business and, more importantly, could give rise to serious safety issues. Aviation authorities believe that runway deicing products that demonstrate decreased corrosion, carbon brake oxidation, and concrete scaling will warrant a strong market positioning.

Further, compositions with characteristics similar to those of deicing fluids are used as heat transfer fluids in numerous industrial and automotive applications and more prevalently where an operating temperature range beyond that provided by water is desired. For example, such compositions are used as heat transfer fluid compositions otherwise known as antifreeze or coolant when applied in the field of automotive engines. In motor vehicles, heat transfer fluids are used to protect engines from overheating and corrosion. However, by necessity, heat transfer fluids used in motor vehicles are antifreeze liquids to enable cold weather motor vehicle operations.

Examples of frost resistant and anticorrosion coolant compositions are disclosed in U.S. Pat. No. 5,104,562. The compositions contain potassium acetate and potassium formate and may further comprise urea and ethylene glycol. U.S. Pat. No. 6,689,289 B1 discloses compositions of monocarboxylates used as freezing point depressants and corrosion inhibitors in heat transfer fluids.

However, current coolant formulations consist of water, glycol, and small amounts of additives to minimize corrosion and foaming. The most prevalent glycol in heat transfer fluid applications is ethylene glycol occupying 98% of the market space.

However, relatively small amounts of ethylene glycol can cause severe health problems or fatalities if swallowed by people or pets.

Deicers, including those used in airport deicing applications, are dispensed to the surrounding environment. Similarly, about 39% of coolant is disposed of improperly such as onto soil, into public drains and sewer systems, or into open waters. These direct releases into the environment present possible routes of exposure to human, animal and ecological systems. Glycols such as ethylene glycol and propylene glycol used in deicing and heat transfer applications exert a high Biological. Oxygen Demand (BOD) effect on receiving waters and can be detrimental to aquatic species. Biological Oxygen Demand (BOD) is the amount of oxygen required for biological oxidation by bacteria growing under aerobic conditions. Alternatives to glycols have been commercialized for airport deicing applications. However, the heat transfer fluid industries, including industry catering to the motor vehicle antifreeze-coolant market, do not have environmentally friendly, cost competitive alternatives to glycols available for consideration.

Aqueous salt solutions of succinic acid have also been proven to have deicing and heat transfer properties as disclosed in U.S. Pat. No. 6,287,480; U.S. Pat. No. 6,623,57; U.S. Pat. No. 6,635,188; and U.S. Pat. No. 6,846,431. However, such succinate based fluids have not been put to practice due to the high cost of manufacturing from petrochemical feedstocks. Biocatalytic processes such as those using fermentable sugars as a substrate are seen as an economical and environmental alternative to traditional petrochemical processes. More particularly, such processes involving conversion of low value carbohydrates, including some that are considered as waste products, are of increasing interests. For example, calcium magnesium propionate and acetate based road deicers have been produced using a fermentation process as disclosed in U.S. Pat. No. 5,324,442.

Micro-organisms such as $E.\ coli$, under anaerobic conditions, produce mixtures of carboxylic acids from fermentable broths as disclosed in J. L. Stokes, "Fermentation of glucose by suspensions of $Escherichia\ coli$," J. Bacteriol., 57:147-158, 1949 and U.S. Pat. No. 6,159,738. The carboxylic acids include succinic, acetic and formic acids. The commercially viable, succinate producing microorganisms described in the literature require neutralization of the fermentation broth to ensure the pH does not become too acidic or too alkaline to kill or inhibit the microbes. Neutralization of the fermentation broth results in the production of salts of succinic acid and other residual carboxylic acids such as acetic and formic.

Thus, there is a need for deicing compositions (in solid or liquid form) and heat transfer fluid compositions that provide a good balance between performance and reduced corrosion and pollution attributes.

There is also a need for a deicing composition (in solid or liquid form) having low corrosion and low BOD useful in deicing various surfaces such as road and runways in cold regions as well as a need for heat transfer fluid compositions having a lower BOD effect.

There is further a need for providing a biobased carboxylate salts deicing composition which is economically attractive for use as a commercial deicer, particularly at airports. A similar need exists for making biobased carboxylate salts economically attractive for use as a commercial heat transfer fluid.

SUMMARY

We provide a composition including a mixture of potassium succinate (40 to 80 wt %), potassium formate (10 to 30 wt %), potassium acetate (10 to 30 wt %), based on the weight of the mixture, on a dry basis, wherein the sum of the weight percentage of the potassium acetate and the potassium formate is substantially the same.

We also provide a composition including a mixture of potassium succinate (40 to 80 wt %), potassium formate (10 to 30 wt %), potassium acetate (10 to 30 wt %), based on the weight of the mixture, on a dry basis, wherein the potassium succinate is present in the mixture in an amount of at least 50 wt % of the weight of the mixture, on a dry basis.

We further provide an aqueous composition including a mixture of potassium succinate (20 to 40 wt %), potassium formate (5 to 15 wt %), potassium acetate (5 to 15 wt %), water (30 to 60 wt %, based on the weight of the mixture, wherein the potassium succinate is present in the mixture in an amount of at least 50 wt % of the weight of the mixture, on a dry basis, and the sum of the weight percentage of the potassium acetate and the potassium formate is substantially the same.

DETAILED DESCRIPTION

Figure 1:
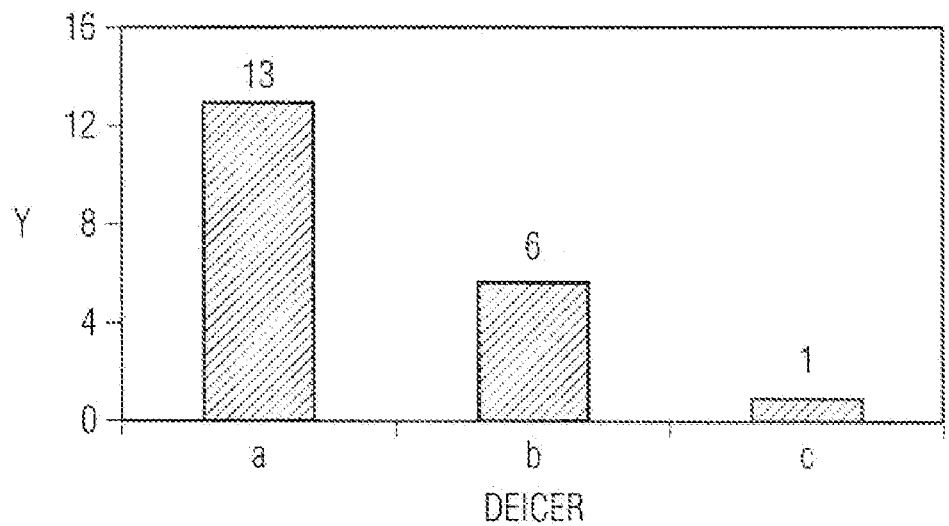
FIG. 1 is a graph of dichromate treated magnesium alloy corrosion in aqueous deicer solutions containing 3 wt % deicer. Corrosion inhibitors were not used. Y=rate in mg/cm$^2$, a=potassium formate, b=potassium acetate, c=potassium succinate.

It will be appreciated that the following description is intended to refer to specific examples of structure selected for illustration in the drawings and is not intended to define or limit the disclosure, other, than in the appended claims.

Each of acetate, formate and succinate has positive, negative or neutral contributory characteristics in the subject fields of use. For example, formate is highly corrosive, whereas succinate has demonstrated corrosion inhibitive properties and acetate can be considered neutral. The biological oxygen demand (BOD) of formate is relatively low while BOD of succinate and acetate are higher than that of formate. In comparison to glycols used for deicing and heat transfer fluid applications, all carboxylates have a lower BOD effect and are more biodegradable.

Figure 2:
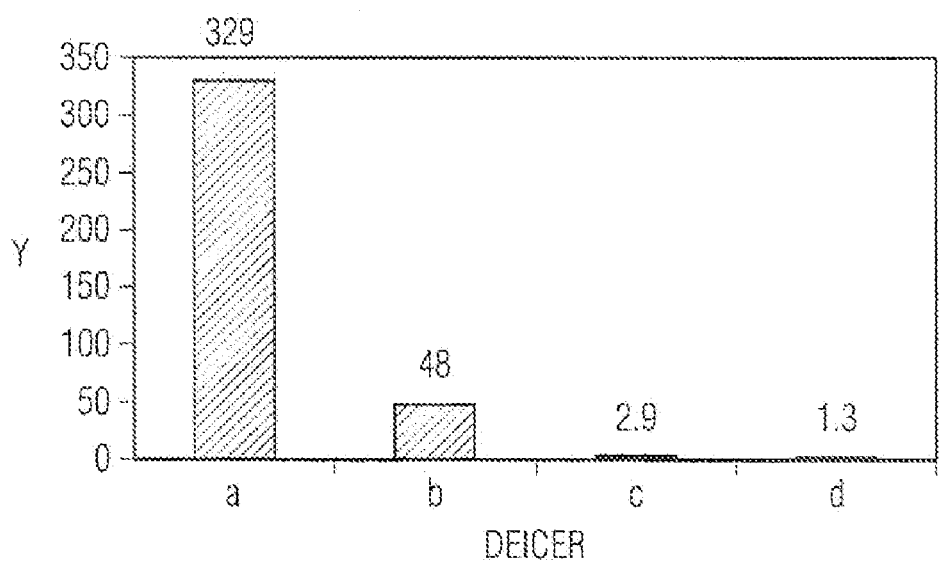
FIG. 2 is a graph of the effect of aqueous deicers on concrete. The cumulative scaled concrete, measured in grams, after 50 freeze-thaw cycles is presented. Y=amount of scaled concrete (g), a=potassium formate, b=potassium acetate, c=potassium succinate, d=deionized, distilled water.

The results presented in FIGS. 1 and 2 demonstrate the benign nature of potassium succinate in comparison to acetate and formate. Dichromate treated magnesium is an alloy used in aircraft construction and is highly susceptible to corrosion in the presence of potassium formate. The effect of acetate is significant while that of succinate is substantially lower. We observed a similar trend in comparing the impact of formate, acetate and succinate on concrete. Concrete erosion due to formate is substantial while that due to acetate is significant. The effect of succinate is negligible and comparable to that of water.

Figure 3:
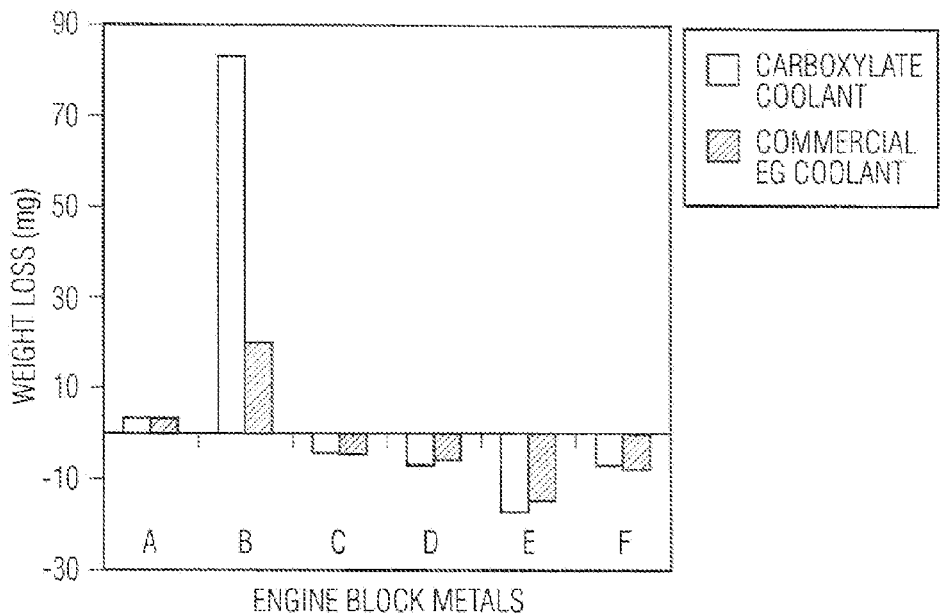
FIG. 3 is a graph showing results for engine block corrosion test conducted according to "Standard Test Method for Corrosion Test for Engine Coolants in Glassware," ASTM Designation: D 1348-01. A=copper, B=solder, C=brass, D=steel, E=cast iron, F=cast aluminum.

The corrosion properties of potassium succinate and potassium acetate based heat transfer fluid, without any additives such as corrosion inhibitors, was tested and compared to a conventional ethylene glycol (EG) coolant formulation purchased from an automobile parts store. The test method used was: "Standard Test Method for Corrosion Test for Engine Coolants in Glassware," ASTM Designation: D 1384-01. The test was conducted at 70° C. under aeration to accelerate corrosion for two weeks. After two weeks, the metals were cleaned and weighed to record weight loss due to corrosion. The results are presented in FIG. 3.

The corrosion profile for the carboxylate based heat transfer fluid is essentially identical to that of the commercial EG coolant except for the solder specimen. Unlike the carboxylate coolant tested, commercial coolants are supplemented with corrosion inhibitors to minimize corrosion. It is anticipated that potential commercial carboxylate heat transfer fluids, including motor vehicle engine coolants, may be supplemented with corrosion and other types of inhibitors.

Compounds that are more persistent in the environment have increased opportunities of exposure to environmental receptors (plant and aquatic life forms). The oxygen demand of a compound during chemical oxidation and biological degradation is an indication of the persistence of the chemical in the environment. Chemical Oxygen Demand (COD) is the amount of oxygen required for the chemical oxidation of compounds in water, as determined using a strong oxidant. BOD is the amount of oxygen required for biological oxidation by bacteria growing under aerobic conditions. The ratio of BOD to COD can be used to assess whether a compound is readily biodegradable. When $BOD_5$ is expressed as a percentage of COD, a $BOD_5$ that is <1% of COD indicates a relatively nonbiodegradable compound and >10% of COD indicates a relatively degradable compound (the subscript "5" denotes a 5 day test). Biodegradability of the subject carboxylates and glycols used for deicing and heat transfer fluids are presented in Table 1.

Each of the three carboxylates has distinct features that are attractive for both runway deicing and heat transfer fluid applications. Potassium succinate is, by far, the most benign deicer with respect to corrosion and structural degradation. Potassium acetate stands out as the best performing deicer and heat transfer fluid due to its characteristically low freezing point. Finally, potassium formate, having the lowest BOD, is the most ecologically sound ingredient. However,

TABLE 1

Environmental properties of runway deicing fluids (RDF) and heat transfer fluids at 50% (wt.) concentration in water.

| Properties | Potassium Succinate ($g\,O_2/g$ fluid) | Potassium Succinate:Acetate 1:1 Ratio ($g\,O_2/g$ fluid) | E36 ®* ($g\,O_2/g$ fluid) | Potassium formate ($g\,O_2/g$ fluid) | Ethylene Glycol ($g\,O_2/g$ fluid) | Propylene Glycol ($g\,O_2/g$ fluid) |
|---|---|---|---|---|---|---|
| $BOD_5$ | $0.17^{14}$ | $0.20^{14}$ | $0.14^{15}$ | $0.10^{16}$ | $0.4^{18}$ | $0.5^{18}$ |
| COD | $0.25^{14}$ | $0.28^{14}$ | $0.30^{15}$ | — | $0.65^{19}$ | $0.84^{19}$ |
| Biodegradability ($BOD_5$/COD)% | 68% | 71% | 47% | 100%[17] | 61% | 59% |

*E36(R) is a potassium acetate-based liquid runway deicer commercialized by the company Cryotech The $BOD_5$ of potassium formate is significantly lower than that of both acetate and succinate. However, the $BOD_5$ values of glycols are substantially higher than that of all the carboxylates. Therefore, glycols such as ethylene glycol and propylene glycol used in deicing and heat transfer applications exert a high BOD effect on receiving waters and, as such, can be detrimental to the environment.

The biodegradability of potassium formate, measured as a ratio of BOD:COD, is 100% in five days, which is an indication of the ease of degradation by bacteria in the environment and, hence, an indication that the formulation will be less persistent in the environment. Both succinate and acetate are also highly biodegradable and not considered as components that will persist in the environment. Both glycols are also readily biodegradable.

The deicing chemicals, in general, melt ice due to their tendency to form aqueous solutions that have lower freezing points. The melted or melting ice/snow is removed from pavements using mechanical devices. Similarly, heat transfer fluid chemicals function due to their tendency to form aqueous solutions that have lower freezing points and higher boiling points, effectively increasing the operating range with respect to temperature. Therefore, the freezing point of these fluids is a reasonable indicator of performance.

A comparison of the freezing points is given in Table 2. Although all the fluids have reasonably close freezing points, potassium acetate has a clear lead by virtue of its lower freezing point.

none of the carboxylates taken separately demonstrate a clear overall advantage.

We unexpectedly found that a mixture of at least two carboxylic acid salts having a t/c ratio of 2 or lower, including a dicarboxylic salt and a monocarboxylic salt, the dicarboxylic salt being present in the mixture in an amount of at least 50 wt % of the weight of the mixture, on a dry basis, synergistically reduces the freezing point of aqueous solutions of the mixture. It is to be noted that it is unexpected for a person skilled in the art that a dicarboxylic salt (e.g., succinate) would show synergy with a monocarboxylic salt (e.g., formate and/or acetate), both the dicarboxylic and monocarboxylic salts having a t/c ratio of 2 or lower. Thus there is no need for a carboxylate having a higher t/c ratio to obtain the synergy with low monocarboxylic salts having a t/c ratio of 2 or lower.

More particularly, we unexpectedly found that a mixture of carboxylic salts including succinate and formate wherein the succinate is present in an amount of at least 50 wt % of the mixture, provides such compositions and the sum of the weight percentage of the potassium acetate and potassium formate is substantially the same.

The aforesaid composition may be obtained at least in part from a fermentation process utilizing low costs carbohydrates (including agricultural and forestry wastes or by-products). A further advantage of such compositions is that it can be made directly from a fermentation broth, which significantly reduces the costs associated with manufacturing a synthetic

TABLE 2

Freezing point of runway deicing fluids (RDF) and heat transfer fluids at 25% (wt.) concentration in water.

| Property | Potassium Succinate (° C.) | Potassium Succinate:Acetate 1:1 Ratio (° C.) | Potassium Acetate (° C.) | Potassium formate (° C.) | Ethylene Glycol (° C.) | Propylene Glycol (° C.) |
|---|---|---|---|---|---|---|
| Freezing point | $-12.5^{14}$ | $-14.5^{14}$ | $-18.0^{14}$ | $-15.0^{17}$ | $-12.0^{20}$ | $-11.0^{21}$ | formulation, all the while significantly reducing or eliminating the costs for disposing agricultural and forestry wastes or byproducts.

We provide new compositions having unique and unexpected characteristics, useful in various applications such as deicing or heat transfer, and that is beneficial with respect to corrosion and the environment. Such compositions may be useful as deicing or heat transfer fluids.

The composition includes a composition for deicing or for preparing a heat transfer fluid, wherein the composition comprises a mixture of at least two carboxylic acid salts having a t/c ratio of 2 or lower, including a dicarboxylic salt and a monocarboxylic salt, the dicarboxylic salt being present in the mixture in an amount of at least 50 wt % of the weight of the mixture, on a dry basis.

Preferably, the composition may be for deicing or for preparing a heat transfer fluid, wherein the composition comprises a mixture of at least two carboxylic acid salts including a formate and a succinate, the succinate being present in the mixture in an amount of at least 50 wt % of the weight of mixture, on a dry basis.

The mixture may be obtained at least in part from a fermentation broth comprising at least one carbohydrate source, and at least one carboxylic acid producing microorganism. Advantageously, a mixture of salts of carboxylic acids obtained at least in part by the fermentation of a carbohydrate source (sugars) in the presence of a source of nitrogen and at least one carboxylic acid producing microorganism. Optionally, the amounts of carboxylic salts may be adjusted to meet with the aforesaid proportions by mere addition and mixing of the missing portion of carboxylic salts in the mixture or in the fluid composition.

Preferably, the above-mentioned carboxylic acid producing microorganism may be *Aspergillus niger, Corynebacterium glutamicum* (also called *Brevibactehum flafum*), *Escherichia coli, Enterococcus faecalis, Veillonella parvula, Actinobacillus succinogenes, Mannheimia succiniciproducens, Anaerobiospirillum succiniciproducens, Paecilomyces varioti, Saccharomyces cerevisiae, Bacteroides fragilis, Bacteroides ruminicola, Bacteroides amylophilus*, or a mixture thereof. Particularly preferably, the carboxylic acid producing microorganism is *E. coli*.

Preferably, the carbohydrate source present in the fermentable broth which is to be used to prepare the composition comprises hexoses, pentoses or mixtures thereof. Upon fermentation in the presence of the microorganism, those hexoses, pentoses or mixtures thereof produce salts of carboxylic salts. For example, the fermentation may be preformed according to the protocol disclosed in U.S. Pat. No. 6,743,610 B2. More preferably, the above-mentioned carbohydrate source comprises hexoses, pentoses or mixtures thereof.

Preferably, the mixture may further comprise additional carboxylic acid salts or catabolic organic acids. Non limiting examples of the additional carboxylic acid salts may be carboxylic acid salts of acetate, malate, fumarate, citrate, lactate, or propionate. More preferably, the additional carboxylic salt may be an acetate salt.

Preferably, the salts of carboxylic acid present in the composition are, for example, potassium, sodium, ammonium, calcium, and/or magnesium salts of succinate, acetate, formate, malate, fumarate, citrate, lactate, propionate, or other catabolic organic acids. More preferably, the carboxylic acid salts may be sodium, potassium, ammonium, calcium, or magnesium salts or mixtures thereof.

Particularly preferably, the above-mentioned mixture of carboxylic acid salts may comprise potassium succinate, potassium formate and potassium acetate.

The fermented broth, prior to concentration, may comprise up to about 200 g/L of any salts of carboxylic acid. The broth may be concentrated via evaporation to obtain a desired carboxylate concentration. Moreover, the mixed carboxylates fermentation broth may be further treated for purification such as for reducing color. The fermented broth may also be treated to remove biomass and other contaminants.

The quantities of the carboxylates present in the composition of the invention may be adjusted to provide enhanced properties to the final composition. The adjustment may be done through concentrating of the fermented broth and/or by further addition of at least one of the carboxylates. For example, potassium formate can be further added to the fermented broth or concentrated to reduce the BOD value of the composition, thereby making the composition more attractive from an ecological stand point. The percentage of potassium formate in the composition can be <50 wt % to enhance the BOD value (the percentages being expressed in weight of the total weight of the mixture, on a dry basis). Optionally, potassium acetate or potassium formate can be added to the fermented broth or concentrated to decrease its freezing point and enhance performance. The optimum percentage of potassium acetate or potassium formate in the composition can be <50 wt %, each, on a dry basis to decrease its freezing point. Furthermore, potassium succinate may be added to the fermented broth or concentrated to reduce structural damages induced by the composition such as corrosion, concrete erosion and carbon brake oxidation. A preferred percentage of potassium succinate in the composition can be about 65 wt %. Therefore, we advantageously provide a versatile composition in which the quantities of each of the carboxylates may be changed to obtain a deicing or heat transfer fluid composition with the desired properties. The final properties of the composition may also be changed by balancing the quantities of each carboxylate.

The composition may comprise:

| | |
|---|---|
| potassium succinate | 50 to 90 wt %, preferably 60 to 80 wt %; |
| potassium formate | 10 to 50 wt %, preferably 10 to 20 wt %; and |
| potassium acetate | 0 to 40 wt %, preferably 10 to 20 wt %; | considering that the sum of the percentages is 100 wt % of the mixture, on a dry basis.

The mixture of carboxylic acid salts may be in solid form. The solid mixture can be directly applied for deicing. In such a case, the mixture may be obtained by mere evaporation of the broth water and subsequent precipitation or crystallization and drying. Any appropriate means or apparatuses for evaporation, crystallization, and drying well known to those skilled in the art can be used. Alternatively, the solid mixture may be obtained by mixing appropriate amounts in weight of carboxylic salts using appropriate means or apparatuses for mixing and blending well known to those skilled in the art.

The composition may further comprise a solvent in which the mixture of carboxylic salts is solubilized. Preferably, the solvent may be any appropriate solvent that is not harmful to the environment, human beings or animals such as pets. Non limiting examples of solvent may comprise water, monohydric alcohols having 1 to 6 carbon atoms, polyhydric alcohols having 3 to 12 carbon atoms, monomethyl or monoethyl ethers of polyhydric alcohols having 3 to 12 carbon atoms or mixtures thereof. More preferably, the solvent may comprise water, methanol, ethanol, propanol, isopropanol, butanol, pentanol or mixtures thereof. Preferably, the monohydric alcohol is ethanol, methanol or an admixture of the methanol and ethanol. Particularly preferably, the solvent is water. The composition comprising a solvent may be of the type ready to be used or a liquid premix requiring to be diluted before use.

The composition may be an aqueous composition for deicing or heat transfer, wherein the composition comprises a mixture of:

| | |
|---|---|
| potassium succinate | 60 to 80 wt %; |
| potassium formate | 10 to 20 wt %; and |
| potassium acetate | 10 to 20 wt %; | considering that the sum of the percentages is up to 100 wt % of the mixture, and wherein the mixture is in a concentration of from 30 to 60 wt % in water. Again, this aqueous composition can be of the type ready to be used or may define a premix that can be diluted in water before use, as far as aforesaid concentrations are met.

We also provide methods for deicing a surface covered by ice, snow of a mixture thereof or preventing the accumulation of ice, snow or a mixture thereof on a surface comprising applying on the surface covered by ice, snow or a mixture thereof, or susceptible of being covered by ice, snow or a mixture thereof, any of the compositions defined hereinabove. The composition may be applied to the surface by any appropriate means or apparatuses well known to those skilled in the art.

The composition may be an aqueous composition as defined hereinabove and used as a heat transfer fluid coolant in a heat transfer system comprising a heat transfer fluid provided with a cooling system.

The deicing composition is useful in residential or commercial deicing applications. Preferably, such a surface is a runway such as an airport runway.

We further provide methods for cooling an engine comprising providing a heat transfer fluid composition as an engine coolant; introducing the composition into a cooling system of the engine; and running the engine containing the coolant.

The heat transfer fluid composition is particularly useful as an engine coolant for motor vehicles.

As will be shown in the examples that follow, the presence of such components in their relative quantities in the deicing or the heat transfer fluid composition has been shown to provide synergistic effect resulting in highly efficient deicing or heat transfer/antifreeze attributes while presenting improved anticorrosive and environmental friendly attributes.

The deicing composition is effective for deicing residential or commercial surfaces. For instance, the surface to be deiced may be a runway. Preferably, the composition is used as an airport runway deicing fluid. The composition is also suitable for deicing roadways and particularly expensive structures related to roadways such as bridges, ramps, and parking facilities.

Accordingly, we also provide methods of deicing surfaces by application of the deicing composition. The method comprises applying to an ice/snow covered surface or applying to a bare surface prior to an ice/snow event, an amount of the deicing composition as defined hereinabove to substantially reduce the ice/snow on the surface.

The composition is useful as a heat transfer fluid composition. More particularly, the composition is useful as an engine coolant for motor vehicles such as cars, buses, trucks and the like.

Thus, we also provide methods for cooling an engine, comprising providing a heat transfer fluid composition as an engine coolant; introducing the composition into a cooling system of the engine; and running the engine containing the coolant.

We provide novel compositions having unexpected properties for deicing or for the preparation of heat transfer fluid, wherein the composition can comprise a mixture of at least two carboxylic acid salts having a t/c ratio of 2 or lower, including a dicarboxylic salt and a monocarboxylic salt, said dicarboxylic salt being present in, the mixture in an amount of at least 50 wt % of the weight of the mixture, on a dry basis. More preferably, the mixture may comprise at least two carboxylic acid salts including a formate and a succinate, the succinate being present in the mixture in an amount of at least 50 wt % of the weight of the mixture, on a dry basis. The mixture may be obtained at least in part from a fermented broth.

We also provide methods of deicing a runway surface by application of the deicing composition. We further provide methods for cooling an engine using the heat transfer fluid composition as an engine coolant. We further provide methods for heat transfer using the heat transfer fluid composition in industrial applications. Moreover, we provide methods for producing a composition having enhanced characteristics by providing a base composition and adjusting the quantities of each of the carboxylates to obtain the composition with the desired characteristics.

The "t/c ratio" means the ratio of total carbon atom to carboxylic groups. For example, acetate has two carbon atoms with one carboxylate carbon (t/c ratio of 2). Formate has one carboxylate carbon atom and one total carbon (t/c ratio of 1). Propionate has one carboxylate and three total carbons (t/c ratio of 3).

The expression fermented broth or fermented broth mixture generally refers to a broth containing at least one carboxylic acid salt obtained by fermentation of a fermentable broth comprising one or more, carbohydrates or sugars in the presence of a source of nitrogen and at least one carboxylic acid producing organism. For fermentation technologies targeted for chemical industries that are typically classified as "high volume/low value" processes, the fermentable broth can be formulated using inexpensive agricultural and forestry waste/byproducts such as corn steep liquor/solids which contain nutrients in numerous and significant proportions. Some elemental and nutritional fortification of the media using small amounts of inorganic salts and nutrients may be necessary to satisfy physiological requirements of specific microorganisms. Generally, the most productive and economical combination that will satisfy requirements for cell biomass and metabolite production, energy requirements, as well as fermentability requirements are considered in formulating the fermentable broth. Carbohydrates utilized in fermentable broths are numerous. Conventional carbohydrates include glucose, fructose, and sucrose. The latter is a disaccharide glucoside, which is utilized in a number of fermentation processes including the production of proteins, ethanol, organic acids, and amino acids. Hydrolyzed structural polysaccharides from plant biomass are considered as next generation substrates for fermentable broths. Hydrolysis of cellulose and hemicelluloses provide several hexoses (glucose and mannose) and pentoses (xylose and arabinose) for fermentation. Batch fermentations may utilize in excess of 100 g/L of substrate and continuous or fed-batch fermentation may utilize 0.5-4.0 g/L/hr of substrate.

Carboxylic acid producing organisms are organisms capable of producing a carboxylic acid from a carbohydrate source. For example, the organism may be one or a mixture of *Aspergillus niger, Corynebacterium glutamicum* (also called *Brevibacterium flafum*), *Escherichia coli, Enterococcus faecalis, Veillonella parvula, Actinobacillus succinogenes, Mannheimia succiniciproducens, Anaerobiospihllum succiniciproducens, Paecilomyces varioti, Saccharomyces cerevisiae, Bacteroides fragilis, Bacteroides ruminicola, Bacteroides amylophilus, Alcaligenes eutrophus, Brevibacterium ammoniagenes, Brevibacterium lactofermentum, Candida brumptii, Candida catenulate, Candida mycoderma, Candida zeylanoides, Candida paludigena, Candida sonorensis, Candida utilis, Candida zeylanoides, Debaryomyces hansenii, Fusarium oxysporum, Humicola lanuginosa, Kloeckera apiculata, Kluyveromyces lactis, Kluyveromyces wickerhamii, Penicillium simplicissimum, Pichia anomala, Pichia besseyi, Pichia media, Pichia guilliermondii, Pichia inositovora, Pichia stipidis, Saccharomyces bayanus, Schizosaccharomyces pombe, Torulopsis candida, Yarrowia lipolytica*, or any other organism capable of producing carboxylic acids. Preferably, the organism is the microorganism *E. coli*.

A carboxylic acid salt is a salt of a carboxylic acid produced by a microorganism by fermentation of carbohydrates contained in a fermentable broth. The carboxylic acid salt may be, for instance, a monocarboxylic acid, a dicarboxylic acid salt, a tricarboxylic acid or mixtures thereof. Preferably, a mixture of such carboxylic acid salts may be used. For example, the carboxylic acid salts are potassium, sodium, ammonium, calcium, and/or magnesium salts of succinate, acetate, formate, malate, fumarate, citrate, lactate, propionate, or other catabolic organic acids or mixtures thereof. Preferably, the composition comprises a mixture of succinate, acetate and formate. Even more preferably, the composition comprises a mixture of potassium succinate, potassium acetate and potassium formate.

Catabolic organic acids include organic acids found in fermented broths resulting from the metabolism of microorganism used in fermentation processes.

The term "amount" used in selected contexts herein represents an amount of the deicing composition necessary to reduce the quantity of ice and/or snow present on a surface to be deiced. Preferably, such an amount allows reduction or melting of ice and/or snow so that safe conditions are restored allowing the surface to be used for normal activities. Deicing can be accomplished by application of the deicer either prior to the icing/snowing event or following the icing/snowing event.

Heat transfer fluid compositions include fluid compositions having good heat transfer properties, particularly for cooling an engine during use, while also having antifreeze properties to prevent freezing when the engine is not active in cold weather.

Enhanced characteristics can include characteristics intended to be present in the composition. These enhanced characteristics can depend on the particular application which is intended for the composition. For instance, the enhanced characteristic can be an enhanced ecological property. It can also be an enhanced anticorrosive characteristic or an enhanced antifreeze property. The composition may also have a combination of these enhanced characteristics. A composition having enhanced characteristics may be a composition which has good ecological and/or anticorrosion and/or antifreeze characteristics required for a specific use.

The compositions may also include other components. Such components may be added to provide additional characteristics or to further enhance characteristics. For example, selected sodium compounds may be added to the compositions in varying quantities. Also, the sources of selected components of the compositions may be different. For example, some or all of the components of the composition may be obtained from "traditional" chemical sources (typically petroleum based) and not by fermentation. Alternatively, some or all of the components may be derived from succinic acid produced by selected microorganisms by fermentation.

EXAMPLE

In the context of a deicing composition for use on airport runways and other surfaces that require deicing, the desired characteristics of the composition are known. The characteristics include good performance with respect to ice melting, low impact on structural components including aircraft alloys, steel, and concrete, and low BOD to minimize impact on the environment. The data presented above clearly demonstrate that succinate based deicer formulations can have a substantial effect on lowering the impact on both structural components such as aircraft alloys, steel, and concrete and the environment.

The freezing point of deicer solutions is the primary indicator for the performance of deicers. It is also an important characteristic of heat transfer fluids since they are typically formulated to function in cold regions. The freezing point can be measured at both 50% and 25%. In the runway deicer industry, it is measured at 25% due to dilution of the deicer upon application as well as ease of measurement; i.e., the 50% commercial solution is diluted to 25% prior to measurement. The value for a freezing point, of the 1:1 dilution of a commercial deicer with water should be less than −14.5 deg. C. for airport runway deicing applications. Typically, a commercial solution is 50%. It has been discovered that mixed carboxylate salt solutions, particularly those that can be derived from fermented broths, demonstrate synergistic enhancement of freezing points, indicating that such solutions provide enhance performance compared to that of the individual carboxylates. The data are summarized in Table 3 and FIGS. 4, 7 and 8.

Airport and airplane deicers are required to be compliant with stringent requirements set forth by AMS 1435 A such as (1) Freezing point (ASTM D1 177); and (2) Runway concrete scaling resistance (ASTM C 672). These protocols were followed to obtain the data presented in Table 3 and FIGS. 4, 5, and 6.

Figure 4:
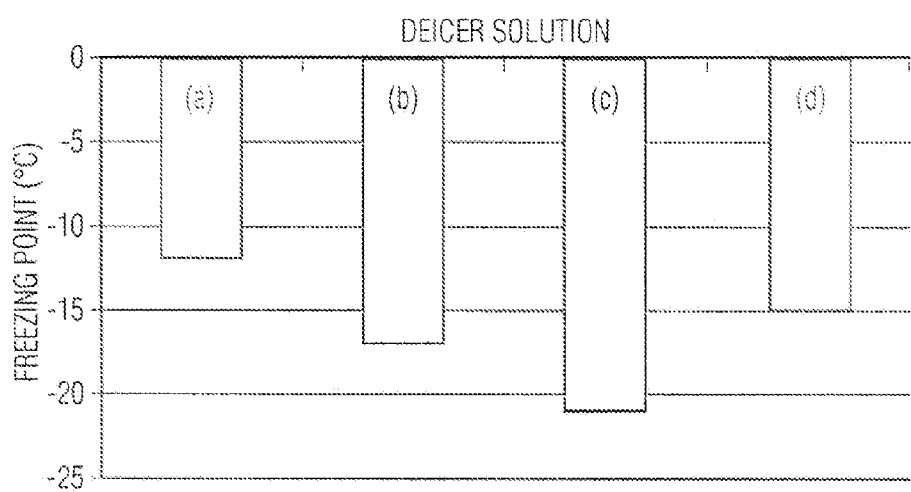
FIG. 4 is a graph showing freezing points of 25% (wt.) aqueous carboxylate solutions. The constituent relative weight composition of the solutions are provided with reference to K-ScAc:K-AcAc:K-FcAc, where K-ScAc is dipotassium succinate, K-AcAc is potassium acetate, and K-FcAc is potassium formate, and (a)=50:0:0, (b)=30:0:20, (c)=25:0:25, and (d)=0:0:50.

FIG. 4 demonstrates the synergistic enhancement in freezing point of mixed dipotassium succinate and potassium formate solutions. The composition consisting of equal amounts of both carboxylate salts show a noticeably lower freezing point than that of potassium formate. Further, the succinate: formate=30:20 composition, which contains less formate, shows a freezing point that is slightly lower than the freezing point of potassium formate.

Figure 7:
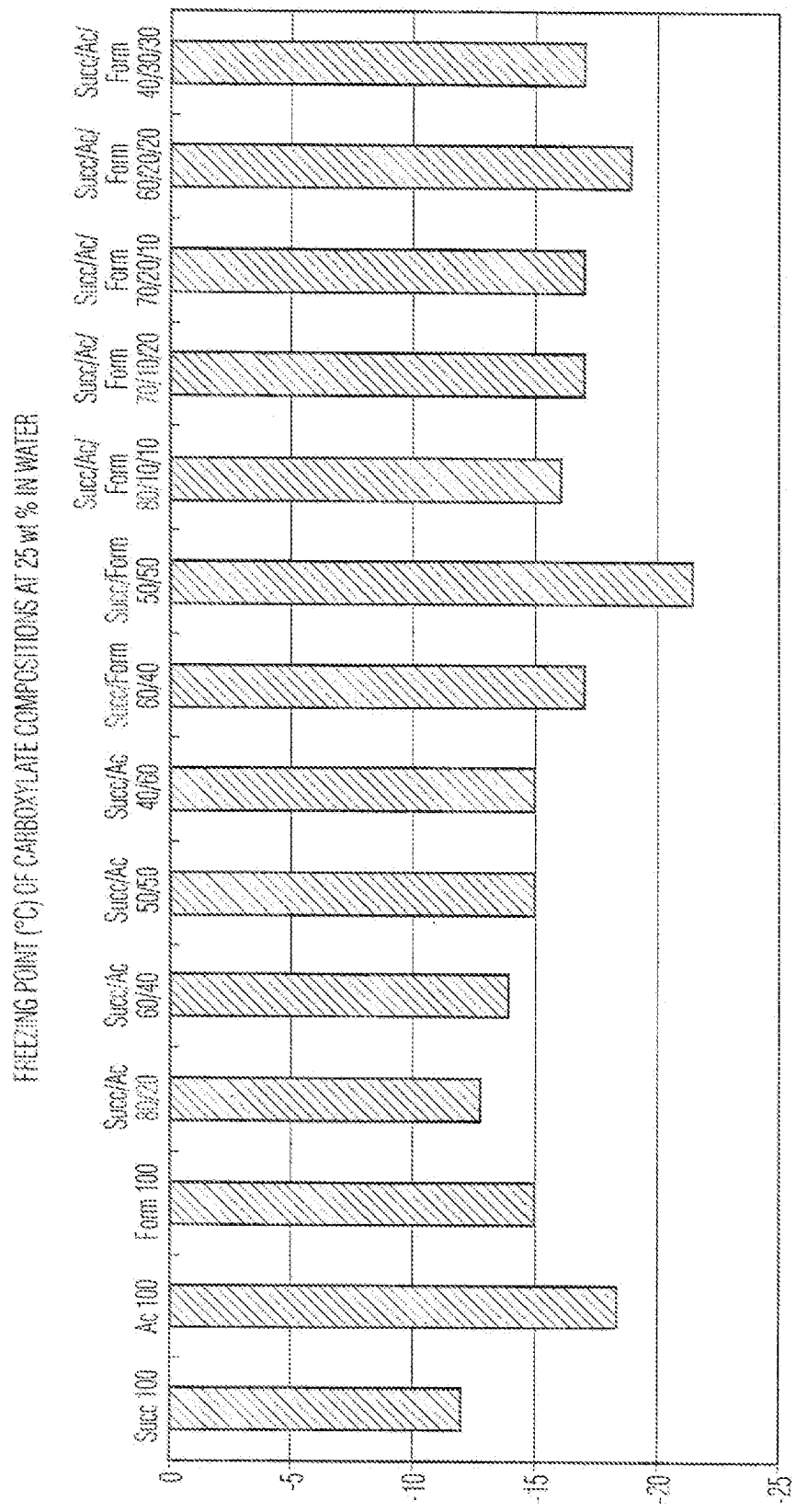
FIG. 7 is a graph showing freezing point (° C.) of carboxylate compositions of Table 3 at 25 wt % in water.
Figure 8:
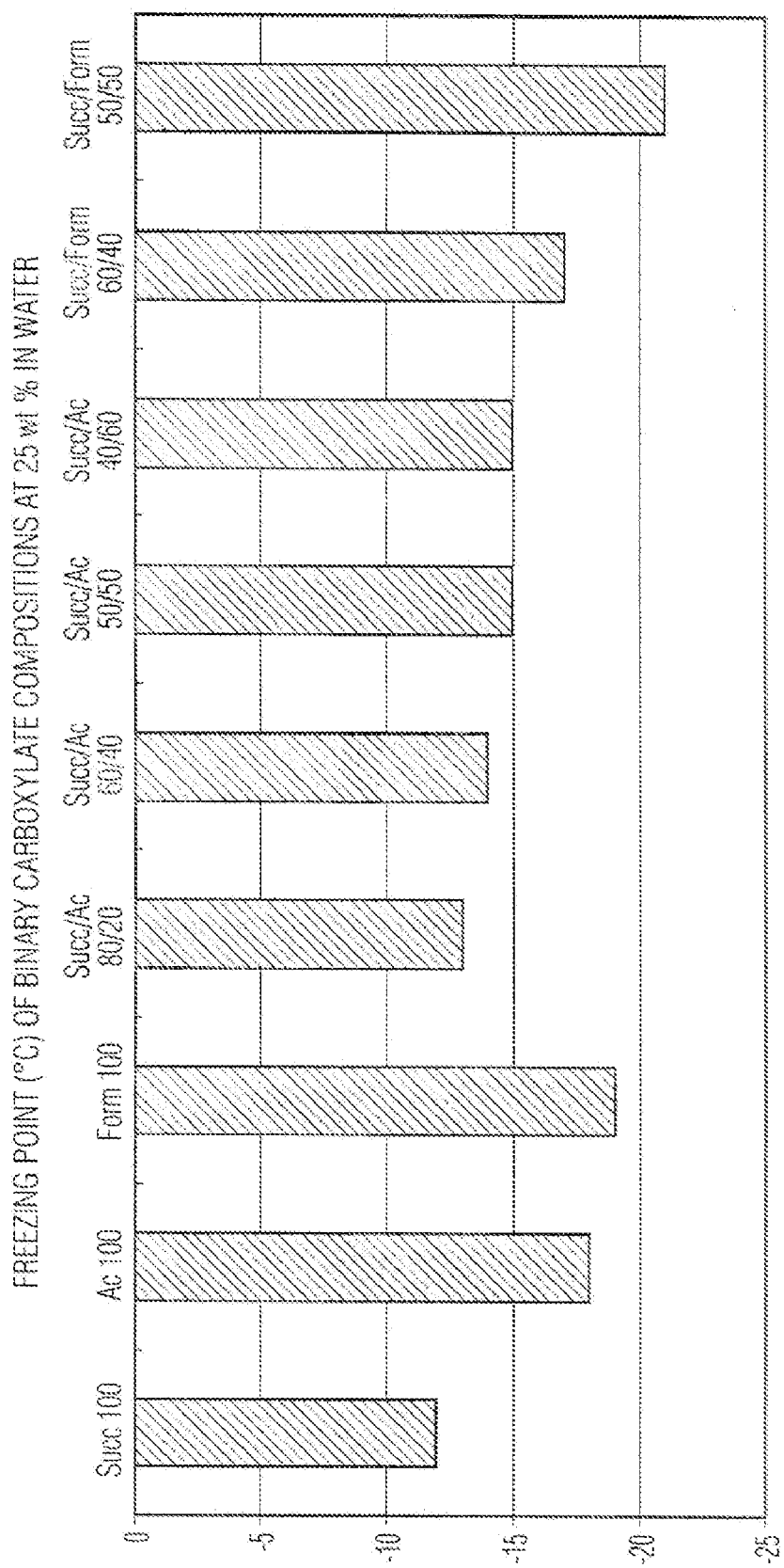
FIG. 8 is a graph showing freezing point (° C.) of binary carboxylate compositions of Table 3 at 25 wt % in water.

The effect of potassium formate on the freezing points of potassium carboxylate mixtures can be observed in data presented in Table 3 and in FIGS. 7 and 8. The freezing point of the succinate:acetate:formate=40:10:0 composition (Test No. 4) was observed to be −13° C. However, the substitution of half of the acetate content with formate resulting in the succinate:acetate:formate=40:5:5 composition (Test No. 5) results in a freezing point of −16° C. This was a substantial enhancement of the freezing point in spite of the quantitatively equivalent substitution. A similar enhancement was observed with Test No. 8 and 9. The freezing point of the succinate:acetate:formate=30:20:0 composition (Test No. 9) was observed to be −14° C. The substitution of half of the acetate content with formate resulting in the succinate:acetate:formate=30:10:10 composition (Test No. 8) results in a freezing point of −19° C. We thus believe that the preferred deicer compositions are those that consist of a relatively greater amount of succinate compared to the sum of acetate and formate where the sum of acetate and formate is made up of substantially equal amounts of acetate and formate such as, for example, compositions presented in Test No. 5 and 8.

Figure 9:
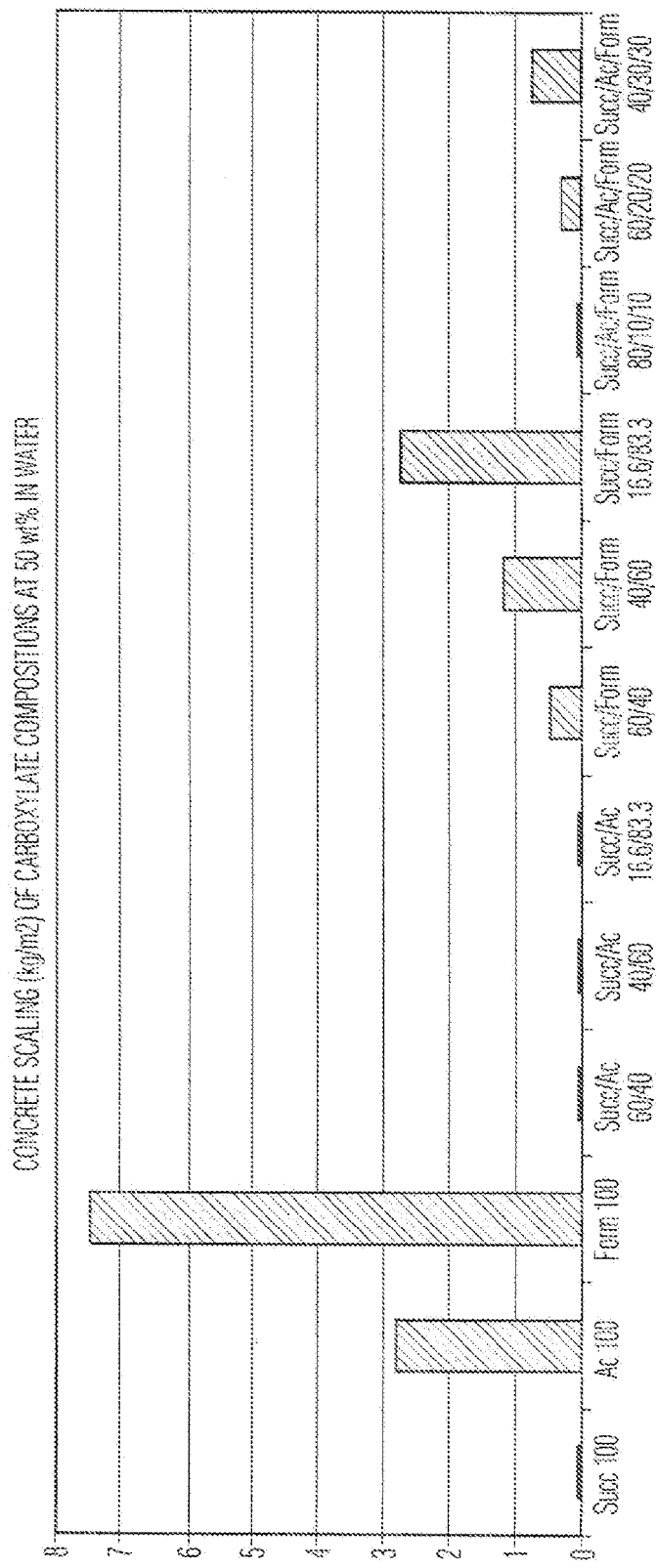
FIG. 9 is a graph showing concrete scaling (kg/m2) of 50 wt % aqueous carboxylate compositions of Table 3 tested per ASTM C 672 & C672M.
Figure 10:
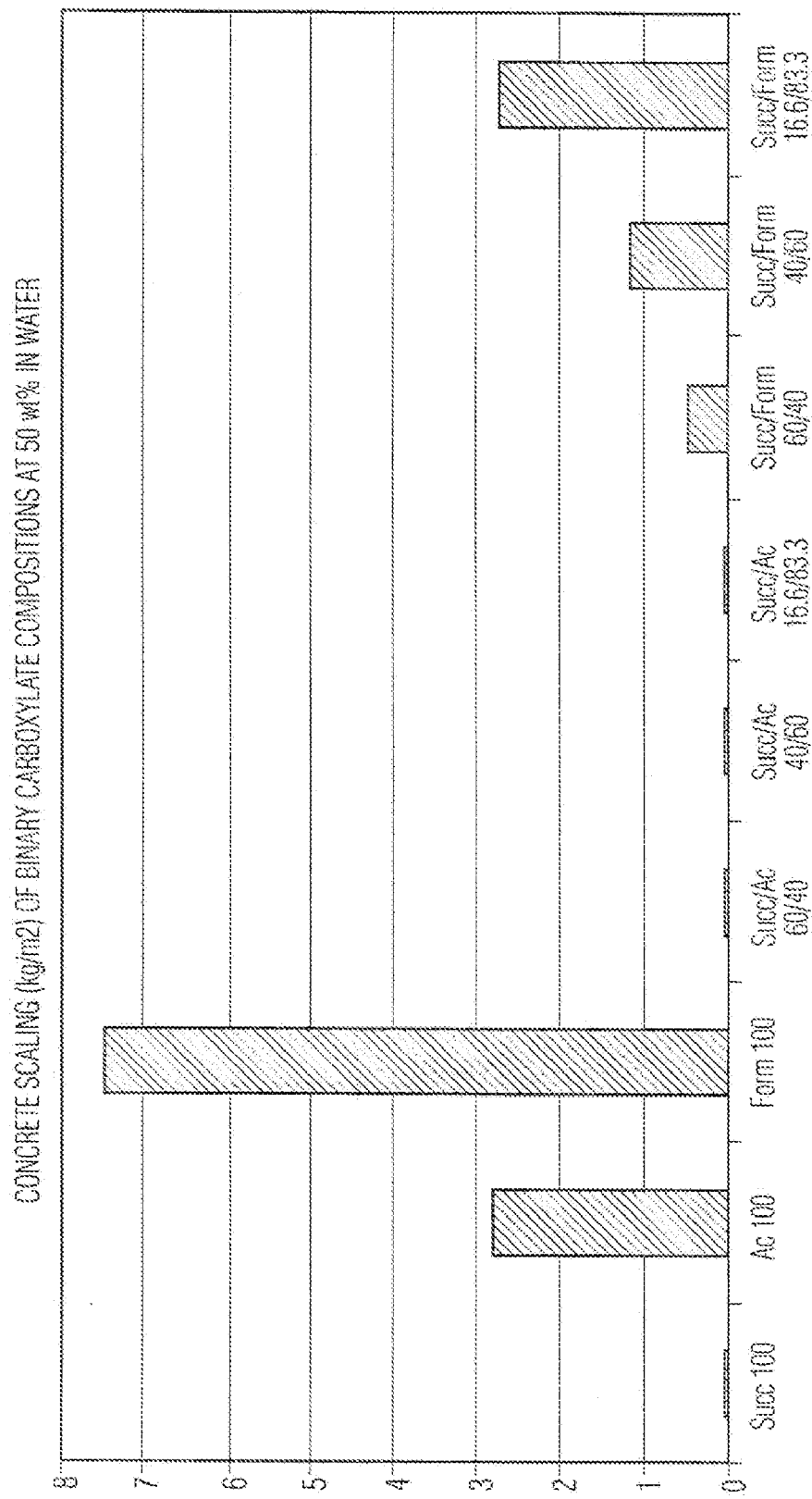
FIG. 10 is a graph showing concrete scaling (kg/m2) of 50 wt % aqueous binary carboxylate compositions of Table 3 tested per ASTM C 672 & C672M.

Previously it had been demonstrated that potassium succinate has a very low impact on concrete compared to the high impact from both potassium acetate and potassium formate (FIG. 2). The benign nature of potassium succinate is confirmed in Table 3 and FIGS. 9 and 10. The results indicate that potassium acetate (Test No. 2) is 5360% more harmful on concrete relative to potassium succinate (Test No. 1) and potassium formate (Test No. 3) is 14,840% more harmful on concrete relative to potassium succinate (Test No. 1).

Figure 5:
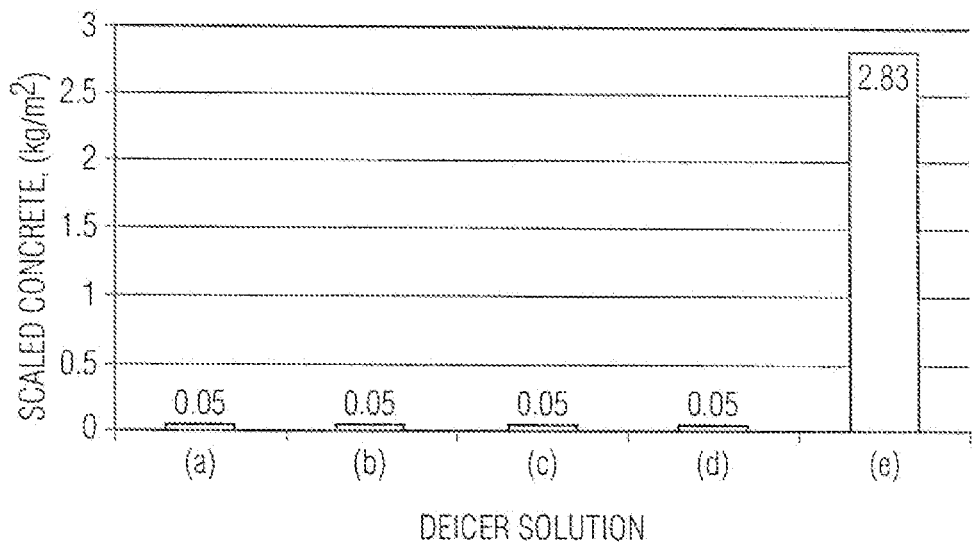
FIG. 5 is a graph showing concrete scaling resulting from aqueous carboxylate solutions. The constituent relative weight composition of the solutions are provided with reference to K-ScAc:K-AcAc:K-FcAc:Water, where K-ScAc is dipotassium succinate, K-AcAc is potassium acetate, and K-FcAc is potassium formate, and (a)=50:0:0:50, (b)=30:20:0:50, (c)=20:30:0:50, (d)=10:50:0:40, and (e)=0:50:0:50. The concrete scaling tests were conducted according to protocols specified in ASTM C 672 & C672M, "Standard Test Method for Scaling Resistance of Concrete Surfaces Exposed to Deicing Chemicals."

We discovered that mixing potassium succinate with both potassium acetate and potassium formate leads to a disproportionate reduction in the degree of concrete scaling. The results are presented in FIGS. 5 and 6. FIG. 5 shows that, a 16.6% substitution of potassium acetate with potassium succinate (deicer solution (d)) leads to a 98.2% reduction in concrete scaling. Substitution of potassium acetate with potassium succinate in all proportions leads to a highly disproportionate reduction in concrete scaling. The prior art predicated that the reduction in concrete scaling due to substitution of potassium acetate with potassium succinate would be proportionate to the rate of substitution. That is, a 20% substitution would lead to a 20% reduction in concrete scaling. Our discovery of the highly disproportionate positive impact of potassium succinate is quite surprising and valuable with respect to formulating aqueous carboxylate compositions for deicing application.

Figure 6:
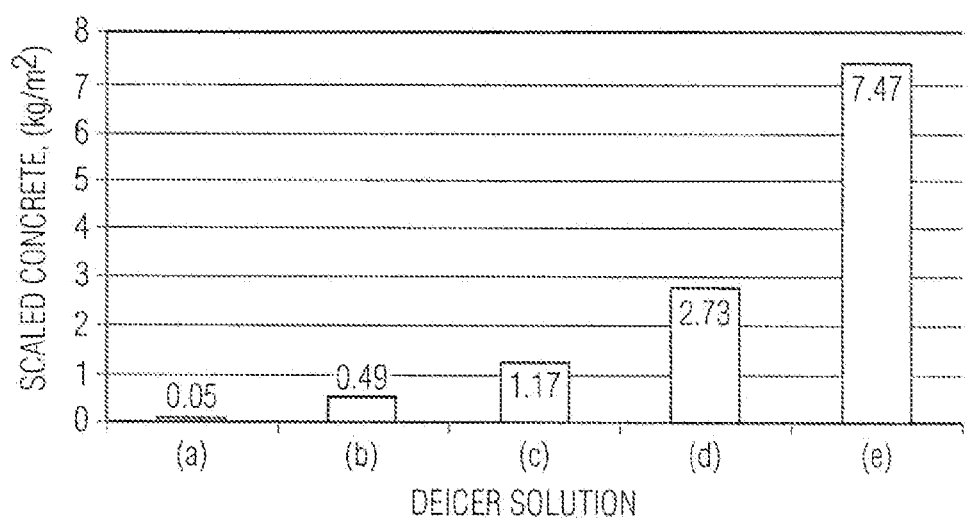
FIG. 6 is a graph showing concrete scaling resulting from aqueous carboxylate solutions. The constituent relative weight composition of the solutions are provided with reference to K-ScAc:K-AcAc:K-FcAc:Water, where K-ScAc is dipotassium succinate, K-AcAc is potassium acetate, and K-FcAc is potassium formate, and (a)=50:0:0:50, (b)=30:0:20:50, (c)=20:0:30:50, (d)=10:0:50:40, and (e)=0:0:50:50. The concrete scaling test were conducted according to protocols specified in ASTM C 672 & C672M, "Standard Test Method for Scaling Resistance of Concrete Surfaces Exposed to Deicing Chemicals."

FIG. 6 shows a similar effect for substitution of potassium formate with potassium succinate. A 16.6% substitution of potassium formate with potassium succinate (deicer solution (d)) leads to a 63.5% reduction in concrete scaling. A 40% substitution of potassium formate with potassium succinate (deicer solution (c)) leads to a 84.3% reduction in concrete scaling.

The discussion above suggests that the preferred deicer compositions, predicated based on freezing point data, are those that consist of a relatively greater amount of succinate compared to the sum of acetate and formate where the sum of acetate and formate is made up of equal amounts of acetate and formate; for example, compositions presented in Test No. 5 and 8. The concrete scaling results also show that such compositions lead to very low concrete scaling, suggesting that those compositions have a better overall profile with respect to performance and impact on infrastructure.

As discussed above, dipotassium succinate is, by far, the most benign deicer with respect to corrosion and structural degradation. Our results also suggest that the inclusion of dipotassium succinate in potassium carboxylate mixtures leads to synergistic enhancement of the freezing point of the mixtures and, therefore, performance as well as a highly disproportionate reduction in concrete scaling. In combination, the discovered compositions provide deicing and heat transfer fluid compositions with enhanced performance and reduced corrosion, concrete scaling, and pollution attributes.

TABLE 3

Experiments on freezing point and concrete scaling of potassium carboxylate solutions.

| Test No. | Composition of Carboxylates % (wt.) in Aqueous Solution | | | Freezing point at 50% Dilution ° C. | Concrete Scaling Kg/m² |
|---|---|---|---|---|---|
| | K—ScAc | K—AcAc | K-FcAc | | |
| 1 | 50 | 0 | 0 | −12 | 0.05 |
| 2 | 0 | 50 | 0 | −18 | 2.83 |
| 3 | 0 | 0 | 50 | −15 | 7.47 |
| 4 | 40 | 10 | 0 | −13 | — |
| 5 | 40 | 5 | 5 | −16 | 0.05 |
| 6 | 35 | 5 | 10 | −17 | — |
| 7 | 35 | 10 | 5 | −17 | — |
| 8 | 30 | 10 | 10 | −19 | 0.29 |
| 9 | 30 | 20 | 0 | −14 | 0.05 |
| 10 | 30 | 0 | 20 | −17 | 0.49 |
| 11 | 25 | 25 | 0 | −15 | — |
| 12 | 25 | 0 | 25 | −21 | — |
| 13 | 20 | 15 | 15 | −17 | 0.73 |
| 14 | 20 | 30 | 0 | −15 | 0.05 |
| 15 | 20 | 0 | 30 | — | 1.17 |
| 16 | 10 | 50 | 0 | — | 0.05 |
| 17 | 10 | 0 | 50 | — | 2.73 |

The results for freezing point and concrete scaling were collected according to the protocols given in ASTM D 1177 and ASTM C 672/C 672 M, respectively. K—ScAc = potassium succinate, K—AcAc = potassium acetate, and K-FcAc = potassium formate.

Although the compositions and methods have been described in connection with specific forms thereof, it will be appreciated that a wide variety of equivalents may be substituted for the specified elements described herein without departing from the spirit and scope of this disclosure as described in the appended claims.

What is claimed is:
1. A composition comprising a mixture of:

| | |
|---|---|
| potassium succinate | 40 to 80 wt %, |
| potassium formate | 10 to 30 wt %, |
| potassium acetate | 10 to 30 wt %, | based on the weight of the mixture, on a dry basis, wherein the sum of the weight percentage of the potassium acetate and the potassium formate is substantially the same.

2. The composition of claim 1, wherein the mixture is obtained at least in part from a fermentation broth comprising at least one carbohydrate source and at least one carboxylic acid producing microorganism.

3. The composition according to claim 2, wherein the carboxylic acid producing microorganism is *Aspergillus niger, Corynebacterium glutamicum, Escherichia coli, Enterococcus faecalis, Veillonella parvula, Actinobacillus succinogenes, Mannheimia succiniciproducens, Anaerobiospirillum succiniciproducens, Paecilomyces varioti, Saccharomyces cerevisiae, Bacteroides fragilis, Bacteroides ruminicola, Bacteroides amylophilus, Alcaligenes eutrophus, Brevibacterium ammoniagenes, Brevibacterium lactofermentum, Candida brumptii, Candida catenulate, Candida mycoderma, Candida zeylanoides, Candida paludigena, Candida sonorensis, Candida utilis, Candida zeylanoides, Debaryomyces hansenii, Fusarium oxysporum, Humicola lanuginosa, Kloeckera apiculata, Kluyveromyces lactis, Kluyveromyces wickerhamii, Penicillium simplicissimum, Pichia anomala, Pichia besseyi, Pichia media, Pichia guilliermondii, Pichia inositovora, Pichia stipidis, Saccharomyces bayanus, Schizosaccharomyces pombe, Torulopsis candida, Yarrowia lipolytica*, or a mixture thereof.

4. The composition according to claim 3, wherein carboxylic acid producing microorganism is *E. coli*.

5. The composition of claim 1, wherein the composition is a deicer.

6. The composition of claim 1, wherein the composition is an engine coolant.

7. The composition of claim 1, further comprising a sodium compound.

8. A composition comprising a mixture of:

| | |
|---|---|
| potassium succinate | 40 to 80 wt %, |
| potassium formate | 10 to 30 wt %, |
| potassium acetate | 10 to 30 wt %, | based on the weight of the mixture, on a dry basis, wherein the potassium succinate is present in the mixture in an amount of at least 50 wt % of the weight of the mixture, on a dry basis.

9. The composition of claim 8, wherein the mixture is obtained at least in part from a fermentation broth comprising at least one carbohydrate source and at least one carboxylic acid producing microorganism.

10. The composition according to claim 9, wherein the carboxylic acid producing microorganism is *Aspergillus niger, Corynebacterium glutamicum, Escherichia coli, Enterococcus faecalis, Veillonella parvula, Actinobacillus succinogenes, Mannheimia succiniciproducens, Anaerobiospirillum succiniciproducens, Paecilomyces varioti, Saccharomyces cerevisiae, Bacteroides fragilis, Bacteroides ruminicola, Bacteroides amylophilus, Alcaligenes eutrophus, Brevibacterium ammoniagenes, Brevibacterium lactofermentum, Candida brumptii, Candida catenulate, Candida mycoderma, Candida zeylanoides, Candida paludigena, Candida sonorensis, Candida utilis, Candida zeylanoides, Debaryomyces hansenii, Fusarium oxysporum, Humicola lanuginosa, Kloeckera apiculata, Kluyveromyces lactis, Kluyveromyces wickerhamii, Penicillium simplicissimum, Pichia anomala, Pichia besseyi, Pichia media, Pichia guilliermondii, Pichia inositovora, Pichia stipidis, Saccharomyces bayanus, Schizosaccharomyces pombe, Torulopsis candida, Yarrowia lipolytica*, or a mixture thereof.

11. The composition according to claim 10, wherein carboxylic acid producing microorganism is *E. coli*.

12. The composition of claim 8, wherein the composition is a deicer.

13. The composition of claim 8, wherein the composition is an engine coolant.

14. The composition of claim 8, further comprising a sodium compound.

15. An aqueous composition comprising a mixture of:

| | |
|---|---|
| potassium succinate | 20 to 40 wt %, |
| potassium formate | 5 to 15 wt %, |
| potassium acetate | 5 to 15 wt %, |
| water | 30 to 60 wt %, | based on the weight of the mixture, wherein the potassium succinate is present in the mixture in an amount of at least 50 wt % of the weight of the mixture, on a dry basis, and the sum of the weight percentage of the potassium acetate and the potassium formate is substantially the same.

16. The composition of claim 15, wherein the mixture is obtained at least in part from a fermentation broth comprising at least one carbohydrate source and at least one carboxylic acid producing microorganism.

17. The composition according to claim 16, wherein the carboxylic acid producing microorganism is *Aspergillus niger, Corynebacterium glutamicum, Escherichia coli, Enterococcus faecalis, Veillonella parvula, Actinobacillus succinogenes, Mannheimia succiniciproducens, Anaerobiospirillum succiniciproducens, Paecilomyces varioti, Saccharomyces cerevisiae, Bacteroides fragilis, Bacteroides ruminicola, Bacteroides amylophilus, Alcaligenes eutrophus, Brevibacterium ammoniagenes, Brevibacterium lactofermentum, Candida brumptii, Candida catenulate, Candida mycoderma, Candida zeylanoides, Candida paludigena, Candida sonorensis, Candida utilis, Candida zeylanoides, Debaryomyces hansenii, Fusarium oxysporum, Humicola lanuginosa, Kloeckera apiculata, Kluyveromyces lactis, Kluyveromyces wickerhamii, Penicillium simplicissimum, Pichia anomala, Pichia besseyi, Pichia media, Pichia guilliermondii, Pichia inositovora, Pichia stipidis, Saccharomyces bayanus, Schizosaccharomyces pombe, Torulopsis candida, Yarrowia lipolytica*, or a mixture thereof.

18. The composition according to claim 17, wherein carboxylic acid producing microorganism is *E. coli*.

19. The composition of claim 15, wherein the composition is a deicer.

20. The composition of claim 15, wherein the composition is an engine coolant.

21. The composition of claim 15, further comprising a sodium compound.

22. The composition of claim 1, wherein the components of the mixture are not produced or derived by fermentation.

23. The composition of claim 1, wherein the components of the mixture are produced or derived from succinic acid produced by fermentation.

* * * * *